United States Patent [19]

Yamamoto et al.

[11] Patent Number: 5,084,527
[45] Date of Patent: Jan. 28, 1992

[54] THERMOPLASTIC RESIN COMPOSITION

[75] Inventors: Naoki Yamamoto; Hiroshi Mori; Akira Nakata; Misayo Suehiro, all of Otake, Japan

[73] Assignee: Mitsubishi Rayon Co., Ltd., Tokyo, Japan

[21] Appl. No.: 475,793

[22] Filed: Feb. 6, 1990

[30] Foreign Application Priority Data

Feb. 23, 1989 [JP] Japan .................................. 1-41735
Feb. 23, 1989 [JP] Japan .................................. 1-41736

[51] Int. Cl.$^5$ ........................................ C08G 63/695
[52] U.S. Cl. .................................. 525/446; 525/444; 525/474
[58] Field of Search ................. 525/446, 444, 474

[56] References Cited

U.S. PATENT DOCUMENTS 4,812,518  3/1989  Haubennestel et al. ............ 525/100
4,894,427  1/1990  Yamamoto et al. .................. 528/26

FOREIGN PATENT DOCUMENTS 62-121752  6/1987  Japan .
2138336    5/1990  Japan .

Primary Examiner—John C. Bleutge
Assistant Examiner—D. E. Aylward
Attorney, Agent, or Firm—Oblon, Spivak, McClelland, Maier & Neustadt

[57] ABSTRACT

A thermoplastic resin composition comprising: (A) at least one resin selected from the group consisting of a polyester resin and a polycarbonate resin, and (B) an aromatic polyester-polyorganosiloxane block copolymer, a weight ratio of (A) and (B) (=A/B) being 10/90 to 90/10. With the addition of the copolymer (B), impact strength of the composition can be improved without impairing the properties of the resin (A).

12 Claims, No Drawings

THERMOPLASTIC RESIN COMPOSITION

BACKGROUND OF THE INVENTION

1. Field of the Invention

This invention relates to a thermoplastic resin composition that is superior in impact resistance, heat resistance, mechanical strength, moldability, and fluidity, more specifically, to a thermoplastic resin composition comprising at least one resin (A) selected from the group consisting of a polyester resin and a polycarbonate resin, and an aromatic polyester-polyorganosiloxane block copolymer (B).

2. Description of the Prior Art

Polyester resins, depending on the composition, are molding materials having high heat resistance and high strength, including a variety of types ranging from general-purpose types to high-performance types. However, these polyester resins generally are insufficient in impact resistance and, especially, a considerable decrease in strength is seen when an impact is exerted on a test speciment provided with a notch.

There have been made many attempts to improve the impact strength. For example, polybutylene terephthalate resin (PBT) is often blended with a rubber component having a low glass-transition temperature (Tg). Such rubber components are roughly divided into four types: ethylene copolymers, butadiene rubber, acrylic rubber, and flexible polyesters (such as PBT/PTMG copolymer). However, with these rubber components added, the polyester resins yet have problems of inferior weatherability and heat resistance, and the blending is not an improvement of impact strength while maintaining the advantageous properties of the polyester resins.

Polycarbonate resin is known as a superior molding material having high impact strength and toughness, high transparency, good dimensional stability, good creep resistance, and good fire retardant properties. However, impact strength of polycarbonate resin is dependent on thickness, and thick products are extremely low in impact strength. Furthermore, polycarbonate resin is often combined with glass fiber as a filler, which has a bad influence on impact resistance characteristics of the polycarbonate resin.

Thus, it is a primary object of the present invention to provide a thermoplastic resin composition which retains advantageous properties of polyester resin or polycarbonate resin, with improved impact resistance.

DESCRIPTION OF THE PREFERRED EMBODIMENTS

The inventors have conducted intensive studies to attain the above object, and found that a resin composition comprising at least one resin (A) selected from the group consisting of a polyester resin and a polycarbonate resin, and an aromatic polyester-polyorganosiloxane block copolymer (B) has a remarkably improved impact resistance and is superior in heat resistance, mechanical strength, moldability, and fluidity, thus accomplishing the present invention.

Thus, in accordance with the present invention, there is provided a thermoplastic resin composition comprising at least one resin (A) selected from the group consisting of a polyester resin and a polycarbonate resin and an aromatic polyester-polyorganosiloxane block copolymer (B), the weight ratio of A to B (A/B) being 10/90 to 90/10.

In the inventive composition, the weight ratio A/B of the two components is 10/90 to 90/10, and if the ratio is out of the range, the resulting composition is inferior in heat resistance, toughness, or impact resistance, which is not preferable.

The polyester resin in the resin (A) of the present invention mainly comprises (a) an aromatic polyester obtained by polycondensation of at least one aromatic dicarboxylic acid and at least one diol selected from the group consisting of dihydric phenols, lower aliphatic diols, and alicyclic diols, (b) an aromatic polyester obtained by polycondensation of at least one aromatic hydroxycarboxylic acid, and (c) an aromatic polyester obtained by copolycondensation of at least one aromatic dicarboxylic acid, at least one diol selected from the group consisting of dihydric phenols, lower aliphatic diols, and alicyclic diols, and at least one aromatic hydroxycarboxylic acid.

Each of the above constituents will now be described. The aromatic dicarboxylic acid is represented by a formula

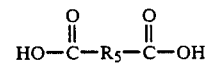

[wherein, $R_5$ is substituted or unsubstituted phenylene, a group of the formula

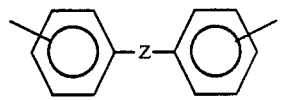

(wherein Z indicates a direct bond or —$CH_2$— or —CO—) or naphthylene], and wherein substituents of the phenylene include chlorine, bromine, and methyl, and a substituted phenylene can have 1 to 4 substituents.

Such aromatic dicarboxylic acids include, for example, terephthalic acid, isophthalic acid, diphenyl-m,m'-dicarboxylic acid, diphenyl-p,p'-dicarboxylic acid, diphenylmethane-m,m'-dicarboxylic acid, diphenylmethane-p,p'-dicarboxylic acid, benzophenone-4,4'-dicarboxylic acid, and naphthalene dicarboxylic acid, which can be used alone or in combination of two or more types. Of these acids, use of terephthalic acid, isophthalic acid, and napthalene dicarboxylic acid is preferable. Furthermore, small amounts of aliphatic dicarboxylic acids such as adipic acid and sebacic acid may be mixed.

The diols include the following. The dihydric phenols include, for example, hydroquinone, resorcinol, 2,6-naphthalenediol, diphenol (biphenyl diol), and 1,8-dihydroxyanthraquinone; dihydric phenols represented by a formula

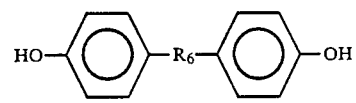

(wherein $R_6$ indicates oxygen, sulfur, —CO—, —$SO_2$—, or an alkylene having 5 or less carbon atoms which may be substituted with one or more halogen atoms), for example, 2,2-bis(4-hydroxyphenyl) propane (bisphenol A), 4,4'-dihydroxydiphenylsulfone, 4,4'-dihydroxydiphenylether, 4,4'-dihydroxydiphenylsulfide, 4,4'-dihydroxydiphenylketone, 4,4'-dihydroxydiphenylmethane, 1,1-bis(4-hydroxyphenyl)-ethane, 1,1-bis(4-hydroxyphenyl)-butane, 1,1-bis(4-hydroxyphenyl)-2,2,2-trichloroethane. The lower aliphatic diols include, for example, ethyleneglycol, propyleneglycol, 1,4-butanediol, 1,5-pentanediol, and 1,6-hexanediol. The alicyclic diols include, for example, cyclohexanediol and cyclohexanedimethanol.

These diols can be used alone or in combination of two or more types and, of these types, 2,2-bis(4-hydroxyphenyl)-propane, hydroquinone, 2,6-naphthalenediol, ethyleneglycol, 1,4-butanediol, and cyclohexanedimethanol are preferably used.

The aromatic hydroxycarboxylic acid is represented by a formula

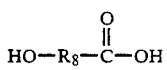

[wherein R$_8$ is phenylene, a group represented by a formula

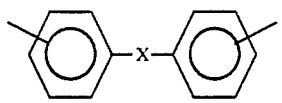

(wherein X is a direct bond or an alkylene of 5 or less carbon atoms), or naphthylene].

Such aromatic hydroxycarboxylic acids include, for example, m-hydroxybenzoic acid, p-hydroxybenzoic acid, 2-hydroxy-6-naphthoic acid, 2-(4'-hydroxyphenyl)-2-(4'-carboxylphenyl)-propane, 4-hydroxyphenyl-4-carboxyphenyl-ether. These acids can be used alone or in combination of two or more types and, of these acids, p-hydroxybenzoic acid and 2-hydroxy-6-naphthoic acid are preferably used.

A preferable polyester resin (A) used in the present invention includes polyester resins which have a repetition unit

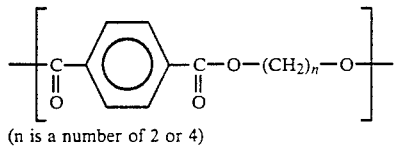

(n is a number of 2 or 4)

or

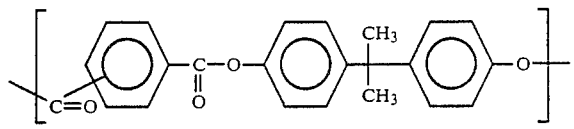

or

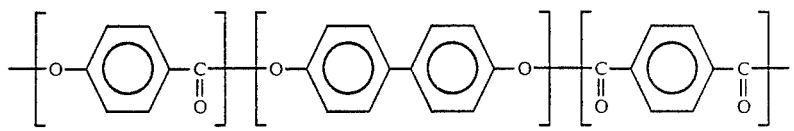

or

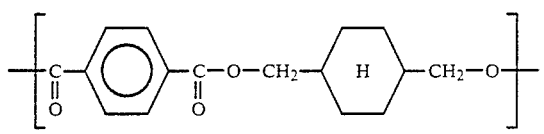

Furthermore, the polycarbonate resin in the resin (A) of the present invention has a repetition unit represented by a formula

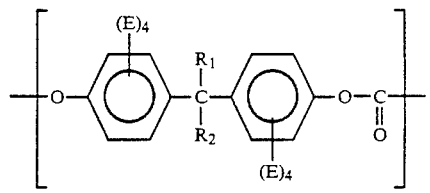

(wherein R$_1$ and R$_2$ are individually hydrogen atom, a univalent lower alkyl, aryl, or alicyclic group which may be independently substituted with halogen, and E is a group or atom selected from the group consisting of hydrogen, lower alkyl, halogen, or mixtures thereof, which may be the same or different each other), and is obtained by reacting a diphenol with a carbonate precursor.

The diphenol includes 2;2-bis(4-hydroxyphenyl)-propane, bis(4-hydroxyphenyl)-methane, 2,2-bis(4-hydroxy-3-methylphenyl)-propane, 4,4-bis(4-hydroxyphenyl)-heptane, 2,2-(3,5,3',5'-tetrachloro-4,4'-dihydroxydiphenyl)-propane, 2,2-(3,5,3',5'-tetrabromo-4,4'-dihydroxydiphenyl)-propane, (3,3'-dichloro-4,4'-dihydroxydiphenyl)-methane and the like, which can be used alone or in combination of two or more types. Of these diphenols, it is preferable to use 2,2-bis(4-hydroxyphenyl)-propane.

The carbonate precursor can be a carbonylhalide, a carbonate ester, or a haloformate. The carbonylhalide is carbonylbromide, carbonylchloride, or a mixture thereof. The carbonate ester includes diphenyl carbonate, di-(chlorophenyl) carbonate, di-(bromophenyl) carbonate, di-(trichlorophenyl) carbonate, di-(tribromophenyl) carbonate, ditolyl carbonate, dinaphthyl carbonate, dichloronaphthyl carbonate, phenyltricarbonate, chlorophenyl-chloronaphthyl carbonate and the like, which can be used alone or in combination of two or more types. It is preferable to use carbonylchloride.

The aromatic polyester-polyorganosiloxane block copolymer (B) used in the present invention will now be described. The aromatic polyester-polyorganosiloxane block copolymer (B) is a block copolymer of an aromatic polyester and polyorganosiloxane, preferably having a compositional ratio of aromatic polyester and polyorganosiloxane of 90:10 to 10:90. It is preferable that one polyester segment has a number average molecular weight of 1,800 or more. One polyorganosiloxane segment preferably has a number average molecular weight of 700 or more. A molecular weight less than the ranges tends to result in a low elasticity, which leads to deteriorated properties of the resulting composition, which is not preferable.

The aromatic polyester segment of the aromatic polyester-polyorganosiloxane block copolymer (B) mainly comprises an aromatic polyester selected from the group consisting of:

(d) an aromatic polyester obtained by polycondensation of at least one aromatic dicarboxylic acid and at least one diol selected from the group consisting of a dihydric phenol, a lower aliphatic diol, and an alicyclic diol;

(e) an aromatic polyester starting from at least one aromatic hydroxycarboxylic acid; and (f) an aromatic polyester obtained by copolycondensation of at least one aromatic dicarboxylic acid, at least one diol selected from the group consisting of a dihydric phenol, a lower aliphatic diol, and an alicyclic diol, and at least one aromatic hydroxycarboxylic acid.

The aromatic dicarboxylic acids, dihydric phenols, lower aliphatic diols, alicyclic diols, and aromatic hydroxycarboxylic acids used in the aromatic polyester-polyorganosiloxane block copolymer (B) are similar to those described above for the polyester resin (A).

Preferable types of the polyester segment include: an aromatic polyester comprising terephthalic acid and 1,4-butanediol; an aromatic polyester comprising a terephthalic acid/isophthalic acid mixture and 2,2-bis(4-hydroxyphenyl)-propane; a copolymer of p-hydroxybenzoic acid, 2,6-naphthalenedicarboxylic acid, and hydroquinone; a copolymer of p-hydroxybenzoic acid, 2,6-naphthalenedicarboxylic acid, isophthalic acid, and hydroquinone; a copolymer of p-hydroxybenzoic acid and 2-hydroxy-6-naphthoic acid; and a copolymer of p-hydroxybenzoic acid, 2,6-naphthalenedicarboxylic acid, and 2,6-naphthalenediol. The aromatic polyester used in the polyester segment may be one which exhibits liquid crystal properties.

The polyorganosiloxane segment used in the aromatic polyester-polyorganosiloxane block copolymer (B) is represented by a formula

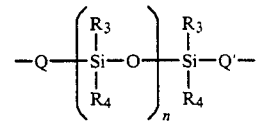

(wherein $R_3$ and $R_4$ individually indicate methyl or phenyl; Q and Q' indicate a divalent group; and n is an integral number of 10 or greater), preferably represented by a formula

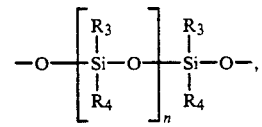

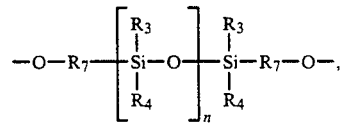

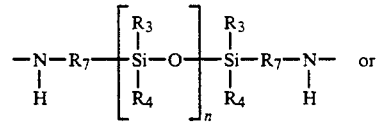

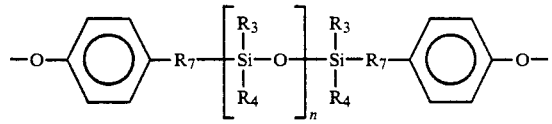

(wherein $R_3$ and $R_4$ individually indicate methyl or phenyl; $R_7$ indicates a lower alkylene or a lower alkylene ether; and n is an integral number of 10 or greater). More preferably, it is polydimethylsiloxane.

The aromatic polyester (A) can be produced by a conventional melt polycondensation, solution polycondensation or interfacial polycondensation method known in the art.

The aromatic polyester-polyorganosiloxane block copolymer (B) can be produced by a conventional melt polycondensation, solution polycondensation or interfacial polycondensation method known in the art using an organosiloxane oligomer and aromatic polyester oligomer or monomers for producing an aromatic polyester.

For example, a block copolymer can be produced by solution polycondensation from a dimethylamine-terminal type polyorganosiloxane and a diol-terminal type aromatic polyester (Ind. Eng. Chem. Prod. Res. Develop., Vol. 12, No. 4, 1973, or TRANSACTIONS OF THE SOCIETY OF RHEOLOGY 21:2, 273-290, or Applied Polymer Symposium No. 22, 143-156 (1973), or 30th National SAMPE Symposium Mar. 19-21, 1985). Or a block copolymer can be produced by interfacial polycondensation using dialkylamine-terminal type polyorganosiloxane and monomer constituents of aromatic polyester (ACS, Polym. Prop. (1983) or 30th National SAMPE Symposium Mar. 19-21, 1985). Or, a diol-terminal type polyorganosiloxane, an aromatic dicarboxylic dihalide, and a dihydric phenol can be reacted in a halogenated organic solvent such as chloroform using a tertiary amine such as pyridine as a hydrogen chloride removing agent, or monomer constituents of the aromatic polyester or an aromatic polyester and an amino group-terminal type polyorganosiloxane can be subjected to melt condensation polymerization in the presence of an ester exchange catalyst. Thus, the block copolymer may be produced using any of the above methods.

The thermoplastic resin composition of the present invention can be prepared using at least one resin (A) selected from the group consisting of a polyester resin and a polycarbonate resin, and an aromatic polyester-polyorganosiloxane block copolymer (B), for example, using the following procedure:

The constituent (A) and the constituent (B) in a predetermined ratio are mechanically mixed by a conventional apparatus known in the art such as a Banbury mixer or an extruder to be formed into a pellet.

In this case, a stabilizer, a plasticizer, a lubricant, a fire-retardant, a pigment, and/or a reinforcing filler may be added as needed in addition to the constituents (A) and (B).

With the present invention, by combining at least one resin selected from the group consisting of a polyester resin and a polycarbonate resin with an aromatic polyester-polyorganosiloxane block copolymer, a thermoplastic resin composition having an improved impact resistance without impairing the inherent advantageous properties that these resin have, and moldings produced from the inventive resin composition have improved properties.

EMBODIMENTS

The present invention will be described further in detail with reference to the embodiments. Of the evaluation methods for the compositions used in the embodiments, Izod impact strength is a notched Izod impact strength measured at 23° C. according to ASTM D256.

In the Examples, "parts" means "parts by weight" unless otherwise indicated.

First, synthesis examples of the aromatic polyester-polyorganosiloxane block copolymer (B) will be described.

SYNTHESIS EXAMPLES 1-5

Polydimethylsiloxane (M.W.: 5,000) represented by a formula

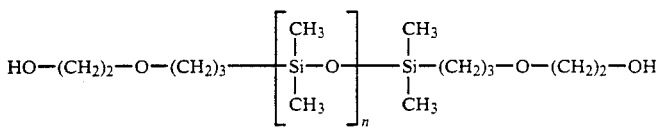

terephthaloyl chloride, and isophthaloyl chloride were charged in compositions shown in Table 1 in a reaction vessel with a stirrer, 200 parts of distilled chloroform was added to obtain a homogeneous solution, bisphenol A in amounts shown in Table 1 (homogeneously dissolved in 50 parts of distilled chloroform and pyridine in amounts shown in Table 1) was added, and the mixture was stirred on an ice bath and in a nitrogen atmosphere for 6-8 hours. The reacted solution was washed with dilute hydrochloric acid and water, and reprecipitated with methanol to retrieve polymers (S-1 to 5).

TABLE 1

| Synthesis Example | Polydimethylsiloxane (wt. part) | Terephthaloyl chloride, isophthaloyl chloride (wt. part) | Bisphenol A (wt. part) | Pyridine (wt. part) | Polymer wt. composition: polyester/siloxane |
|---|---|---|---|---|---|
| 1 (S-1) | 5.0  | 13.4 each | 28.7 | 20.9 | 90/10 |
| 2 (S-2) | 10.0 | 12.2 each | 25.5 | 20.0 | 80/20 |
| 3 (S-3) | 26.0 | 8.6 each  | 15.9 | 13.4 | 50/50 |
| 4 (S-4) | 40.0 | 5.0 each  | 6.4  | 7.9  | 20/80 |
| 5 (S-5) | 46.0 | 3.7 each  | 3.2  | 5.8  | 10/90 |

SYNTHESIS EXAMPLES 6-10

Dimethylterephthalate, 1,4-butanediol, and polydimethylsiloxane (M.W.: 800) represented by a formula

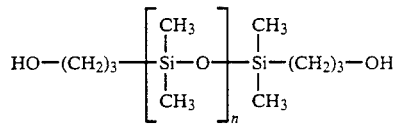

were charged in compositions shown in Table 2 in a reaction vessel with a stirrer, and 50 ppm of 1% butanol solution of butyl titanate [Ti(OC$_4$H$_9$)$_4$] was added as a catalyst. The mixture was heated under stirring in a nitrogen atmosphere from 150° C. to 250° C. in 4 hours. Then, at 250° C., pressure was gradually reduced down to 0.5 mmHg in 2 hours. Stirring was continued for another 3 hours at 250° C. and 0.5 mmHg to complete the reaction, thus yielding polymers (S-6 to 10).

TABLE 2

| Synthesis Example | Polydimethylsiloxane (wt. part) | Dimethyl terephthalate (wt. part) | 1,4-butanediol (wt. part) | Polymer wt. composition: polyester/siloxane |
|---|---|---|---|---|
| 6 (S-6)   | 5.0  | 40.9 | 26.0 | 90/10 |
| 7 (S-7)   | 10.0 | 37.7 | 23.4 | 80/20 |
| 8 (S-8)   | 25.0 | 28.1 | 16.4 | 50/50 |
| 9 (S-9)   | 40.0 | 18.5 | 7.5  | 20/80 |
| 10 (S-10) | 45.0 | 15.3 | 4.9  | 10/90 |

SYNTHESIS EXAMPLES 11-15

Polydimethylsiloxane (M.W.: 900) represented by a formula

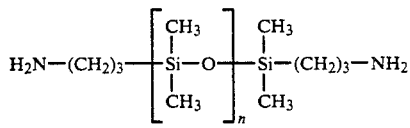
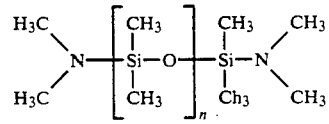

p-acetoxybenzoic acid, and 2-acetoxy-6-naphthoic acid were charged in compositions shown in Table 3 in a reaction vessel with a stirrer, and 50 ppm of 1% butanol solution of butyl titanate [Ti(OC$_4$H$_9$)$_4$] was added as a catalyst. The mixture was heated under stirring in a nitrogen atmosphere from 200° C. to 300° C. in 3 hours. Then, at 300° C., pressure was gradually reduced down to 0.5 mmHg in 1 hour. Stirring was continued for another 3 hours to yield polymers having high viscosity (S-11 to 15).

TABLE 3

| Synthesis Example | Polydimethylsiloxane (wt. part) | p-acetoxybenzoic acid (wt. part) | 2-acetoxy-6-naphthoic acid (wt. part) | Polymer wt. composition: polyester/siloxane |
|---|---|---|---|---|
| 11 (S-11) | 5.0 | 27.9 | 35.7 | 90/10 |
| 12 (S-12) | 10.0 | 24.8 | 31.7 | 80/20 |
| 13 (S-13) | 25.0 | 15.6 | 19.8 | 50/50 |
| 14 (S-14) | 40.0 | 6.2 | 7.9 | 20/80 |
| 15 (S-15) | 45.0 | 3.1 | 4.0 | 10/90 |

SYNTHESIS EXAMPLE 16

36 parts of dimethylterephthalate, 13 parts of 1,4-butanediol, and 80 parts of hydroxyphenethyl-terminal polydimethylsiloxane (number average M.W.: 830) represented by a formula

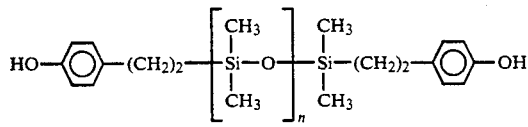

were charged in a reaction vessel with a stirrer, and 50 ppm of 1 weight % butanol solution of butyl titanate [Ti(OC$_4$H$_9$)$_4$] was added as a catalyst. The mixture was heated under stirring in a nitrogen atmosphere at a temperature of 150° C. to 250° C. for 4 hours. Then, at 250° C., pressure was gradually reduced down to 0.5 mmHg in 2 hours. Stirring was continued under 0.5 mmHg for another 3 hours to complete the reaction, thus yielding a polymer having high viscosity (S-16; polyester/polydimethylsiloxane weight ratio=50/50).

SYNTHESIS EXAMPLE 17

22 parts of dimethylterephthalate, 12 parts of cyclohexanedimethanol, and 25 parts of dimethylamino-terminal polydimethylsiloxane (number average M.W.: 1,200) represented by a formula were charged in a reaction vessel with a stirrer, and 50 ppm of 1 weight % butanol solution of butyl titanate [Ti(OC$_4$H$_9$)$_4$] was added as a catalyst. The mixture was heated under stirring in a nitrogen atmosphere at a temperature of 150° C. to 310° C. for 4 hours. Then, at 250° C., pressure was gradually reduced down to 0.5 mmHg in 2 hours. Stirring was continued under 0.5 mmHg for another 3 hours to complete the reaction, thus yielding a polymer having high viscosity (S-17; polyester/polydimethylsiloxane weight ratio=50/50).

SYNTHESIS EXAMPLE 18

25 parts of dimethylamino-terminal polydimethylsiloxane (number average M.W.: 2,500) shown in Synthesis Example 17 and 8.4 parts each of terephthaloyl chloride and isophthaloyl chloride were charged in a reaction vessel with a stirrer, 200 parts of distilled chloroform was added to obtain a homogeneous solution, 16 parts of bisphenol A (homogeneously dissolved in 50 parts of distilled chloroform and 13 parts of pyridine) was added, and the mixture was stirred on an ice bath and in a nitrogen atmosphere for 6–8 hours. The reacted solution was washed with dilute hydrochloric acid and water, and reprecipitated with methanol to retrieve a polymer (S-18; polyester/polydimethylsiloxane weight ratio=50/50).

EMBODIMENTS 1–97

At least one resin (A) selected from the group consisting of a polyester resin and a polycarbonate resin and an aromatic polyester-polyorganosiloxane block copolymer (B) in compositions shown in Table 4 were mixed by an extruder and formed into pellets, under conditions commonly used in the art. The pellets were then individually injection molded into test specimens with predetermined dimensions. These test specimens were measured for Izod impact strength and heat distortion temperature. The results are shown in Table 4.

As the polyester resins and polycarbonate resins were used the following 5 types of resins, and as the aromatic polyester-polyorganosiloxane block copolymers were used S-1 to S-17 shown in Synthesis Examples.

Resin (A)

Commercial polyethyleneterephthalate (PET) resin, ([η]=0.7)
Commercial polybutyleneterephthalate (PBT) resin, ([η]=0.8)
Polycyclohexylene-dimethylene-terephthalate ([PCT; [η]=1.0) obtained from terephthalic acid and cyclohexanedimethanol
Polyarylate (PAr) resin (ηsp/c=0.7) obtained from terephthalic acid/isophthalic acid=50/50 and bisphenol A
Commercial polycarbonate (PC) resin (number average M.W.=23,000)

TABLE 4

| Embodiment | Constituent (A) | Constituent (B) | (A)/(B) wt.ratio | Glass filler (wt.part) | Izod str. (kg.cm/cm) ⅛-in | Izod str. (kg.cm/cm) ¼-in |
|---|---|---|---|---|---|---|
| 1 | PET | S-1 | 90/10 | — | 5.0 | — |
| 2 | PET | S-1 | 75/25 | — | 10 | — |
| 3 | PET | S-1 | 50/50 | — | 17 | — |
| 4 | PET | S-1 | 25/75 | — | 23 | — |
| 5 | PET | S-1 | 10/90 | — | 30 | — |
| 6 | PET | S-2 | 75/25 | — | 18 | — |
| 7 | PET | S-2 | 25/75 | — | 35 | — |
| 8 | PET | S-3 | 75/25 | — | 35 | — |
| 9 | PET | S-3 | 25/75 | — | 67 | — |
| 10 | PET | S-4 | 75/25 | — | 40 | — |
| 11 | PET | S-4 | 25/75 | — | NB | — |
| 12 | PET | S-5 | 75/25 | — | 52 | — |
| 13 | PET | S-5 | 25/75 | — | NB | — |
| 14 | PET | S-16 | 75/25 | — | 40 | — |
| 15 | PET | S-16 | 25/75 | — | 68 | — |
| 16 | PBT | S-6 | 75/25 | — | 12 | — |
| 17 | PBT | S-6 | 25/75 | — | 23 | — |
| 18 | PBT | S-7 | 90/10 | — | 9 | — |
| 19 | PBT | S-7 | 75/25 | — | 11 | — |
| 20 | PBT | S-7 | 50/50 | — | 31 | — |
| 21 | PBT | S-7 | 25/75 | — | 37 | — |
| 22 | PBT | S-7 | 10/90 | — | 49 | — |
| 23 | PBT | S-8 | 75/25 | — | 34 | — |
| 24 | PBT | S-8 | 25/75 | — | 67 | — |
| 25 | PBT | S-9 | 75/25 | — | 41 | — |
| 25 | PBT | S-9 | 25/75 | — | NB | — |
| 27 | PBT | S-10 | 75/25 | — | 55 | — |
| 28 | PBT | S-10 | 25/75 | — | NB | — |
| 29 | PBT | S-11 | 75/25 | — | 12 | — |
| 30 | PBT | S-11 | 25/75 | — | 25 | — |
| 31 | PBT | S-12 | 75/25 | — | 17 | — |
| 32 | PBT | S-12 | 25/75 | — | 34 | — |
| 33 | PBT | S-13 | 75/25 | — | 35 | — |
| 34 | PBT | S-13 | 25/75 | — | 69 | — |
| 35 | PBT | S-14 | 75/25 | — | 40 | — |
| 36 | PBT | S-14 | 25/75 | — | NB | — |
| 37 | PBT | S-15 | 75/25 | — | 55 | — |
| 38 | PBT | S-15 | 25/75 | — | NB | — |
| 39 | PCT | S-18 | 90/10 | — | 17 | — |
| 40 | PCT | S-18 | 75/25 | — | 37 | — |
| 41 | PCT | S-18 | 50/50 | — | 46 | — |
| 42 | PCT | S-18 | 25/75 | — | 67 | — |
| 43 | PCT | S-18 | 10/90 | — | NB | — |
| 44 | PCT | S-12 | 75/25 | — | 16 | — |
| 45 | PCT | S-12 | 25/75 | — | 40 | — |
| 46 | PCT | S-3 | 75/25 | — | 35 | — |
| 47 | PCT | S-3 | 25/75 | — | 69 | — |
| 48 | PCT | S-9 | 75/25 | — | 40 | — |
| 49 | PCT | S-9 | 25/75 | — | NB | — |
| 50 | PAr | S-3 | 90/10 | — | 18 | — |
| 51 | PAr | S-3 | 75/25 | — | 34 | — |
| 52 | PAr | S-3 | 50/60 | — | 44 | — |
| 53 | PAr | S-3 | 25/75 | — | 68 | — |
| 54 | PAr | S-3 | 10/90 | — | NB | — |
| 55 | PAr | S-1 | 75/25 | — | 13 | — |
| 56 | PAr | S-1 | 25/75 | — | 23 | — |
| 57 | PAr | S-2 | 75/25 | — | 17 | — |
| 58 | PAr | S-2 | 25/75 | — | 35 | — |
| 59 | PAr | S-4 | 75/25 | — | 40 | — |
| 60 | PAr | S-4 | 25/75 | — | NB | — |
| 61 | PAr | S-5 | 75/25 | — | 56 | — |
| 62 | PAr | S-5 | 25/75 | — | NB | — |
| 63 | PAr | S-16 | 75/25 | — | 35 | — |
| 64 | PAr | S-16 | 25/75 | — | 69 | — |
| 65 | PAr | S-17 | 75/25 | — | 37 | — |
| 66 | PAr | S-17 | 25/75 | — | 69 | — |
| 67 | PC | S-17 | 90/10 | — | 18 | — |
| 68 | PC | S-17 | 75/25 | — | 37 | — |
| 69 | PC | S-17 | 50/50 | — | 47 | — |
| 70 | PC | S-17 | 25/75 | — | 68 | — |
| 71 | PC | S-17 | 10/90 | — | NB | — |
| 72 | PC | S-8 | 75/25 | — | 37 | — |
| 73 | PC | S-8 | 25/75 | — | 69 | — |
| 74 | PC | S-2 | 75/25 | 20 | — | 15 |
| 75 | PC | S-2 | 25/75 | 20 | — | 39 |
| 75 | PC | S-4 | 75/25 | 20 | — | 42 |
| 77 | PC | S-4 | 25/75 | 20 | — | NB |
| 78 | PAr/PC=50/50 | S-3 | 90/10 | — | 17 | — |
| 79 | PAr/PC=50/50 | S-3 | 75/25 | — | 36 | — |

TABLE 4-continued

| Embodiment | Constituent (A) | Constituent (B) | (A)/(B) wt.ratio | Glass filler (wt.part) | Izod str. (kg.cm/cm) ¼-in | Izod str. (kg.cm/cm) ⅛-in |
|---|---|---|---|---|---|---|
| 80 | PAr/PC=50/50 | S-3 | 50/50 | — | 47 | — |
| 90 | PAr/PC=50/50 | S-3 | 25/75 | — | 68 | — |
| 91 | PAr/pC=50/50 | S-3 | 10/90 | — | NB | — |
| 92 | PAr/pC=50/50 | S-3 | 75/25 | 20 | — | 35 |
| 93 | PAr/pC=50/50 | S-3 | 25/75 | 20 | — | 66 |
| 94 | PBT/PC=50/50 | S-8 | 75/25 | — | 34 | — |
| 95 | PBT/PC=50/50 | S-8 | 25/75 | — | 65 | — |
| 96 | PBT/PC=50/50 | S-8 | 75/25 | 20 | — | 32 |
| 97 | PBT/PC=50/50 | S-8 | 25/75 | 20 | — | 63 |

NB: no breakage

COMPARATIVE EXAMPLES

The five types of resins (A) used in the embodiments were formulated in compositions shown in Table 5 and injection molded as in the embodiments to obtain test specimens, which were evaluated as in the embodiments. The results are shown in Table 5.

TABLE 5

| Comparative Example | Constituent (A) | Glass filler (wt.part) | Izod str. (kg.cm/cm) ¼-in | Izod str. (kg.cm/cm) ⅛-in |
|---|---|---|---|---|
| 1 | PET | — | 1.5 | — |
| 2 | PBT | — | 2.0 | — |
| 3 | PCT | — | 6.0 | — |
| 4 | PAr | — | 15.0 | — |
| 5 | PC | — | 10 | — |
| 6 | PC | 20 | — | 10 |
| 7 | PAr/PC=50/50 | — | 11 | — |
| 8 | PAr/PC=50/50 | 20 | — | 9.0 |
| 9 | PBT/PC=50/50 | — | 6.0 | — |
| 10 | PBT/PC=50/50 | 20 | — | 7.0 |

We claim:

1. A thermoplastic resin composition comprising:
(A) a polyester resin
(B) an aromatic polyester-polyorganosiloxane block copolymer formed from an aromatic polyester segment selected from the group consisting of:
(d) an aromatic polyester obtained by polycondensation of at least one aromatic dicarboxylic acid and at least one diol selected from the group consisting of a dihydric phenol, a lower aliphatic diol, and an alicyclic diol;
(e) an aromatic polyester obtained by polycondensation of at least one aromatic hydroxycarboxylic acid; and
(f) an aromatic polyester obtained by copolycondensation of at least one aromatic dicarboxylic acid, at least one diol selected from the group consisting of a dihydric phenol, a lower aliphatic diol, and an alicyclic diol, and at least one aromatic hydroxycarboxylic acid;
and a polyorganosiloxane segment represented by a formula

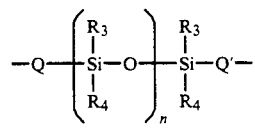

wherein $R_3$ and $R_4$ individually indicate methyl or phenyl; Q and Q' individually indicate a divalent group; and n is an integral number of 10 or greater; and the weight ratio of A to B (A/B) being 10/90 to 90/10.

2. The thermoplastic resin composition as claimed in claim 1 wherein said aromatic polyester-polyorganosiloxane block copolymer has a weight ratio of said aromatic polyester segment to said polyorganosiloxane segment of 90/10 to 10/90.

3. Thermoplastic resin composition as claimed in claim 1 wherein said aromatic polyester segment of said aromatic polyester-polyorganosiloxane block copolymer is obtained by polycondensation of an aromatic carboxylic acid represented by a formula

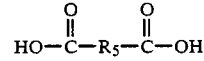

wherein, $R_5$ is substituted or unsubstituted phenylene, a group of a formula

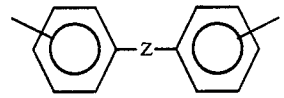

wherein Z indicates a direct bond or —CH$_2$— or —CO—, or naphthylene,
and a dihydric phenol represented by a formula

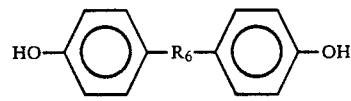

wherein $R_6$ indicates —O—, —S—, —CO—, —SO—, or an alkylene having 5 or less carbon atoms which may be substituted with one or more halogen atoms.

4. The thermoplastic resin composition as claimed in claim 3 wherein said aromatic dicarboxylic acid composing said aromatic polyester segment is at least one aromatic dicarboxylic acid selected from the group consisting of terephthalic acid and isophthalic acid, and said dihydric phenol is 2,2-bis(4-hydroxyphenol)-propane.

5. The thermoplastic resin composition as claimed in claim 1 wherein said aromatic dicarboxylic acid composing said aromatic polyester segment is represented by a formula

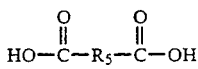

wherein $R_5$ means the same as in claim 3, said lower aliphatic diol is an alkylenediol having 2 to 6 carbon atoms, and said alicyclic diol is cyclohexanediol or cyclohexanedimethanol.

6. The thermoplastic resin composition as claimed in claim 5 wherein said aromatic dicarboxylic acid is at least one aromatic dicarboxylic acid selected from the group consisting of terephthalic acid and isophthalic acid, said lower aliphatic diol is at least one diol selected from the group consisting of ethyleneglycol and 1,4-butanediol, and said alicyclic diol is cyclohexanedimethanol.

7. The thermoplastic resin composition as claimed in claim 1 wherein said aromatic polyester segment comprises a polyester exhibiting liquid crystal properties.

8. The thermoplastic resin composition as claimed in claim 7 wherein said aromatic polyester segment is a copolycondensation product of p-hydroxybenzoic acid, 2,6-naphthalene-dicarboxylic acid, and hydroquinone.

9. The thermoplastic resin composition as claimed in claim 7 wherein said aromatic polyester segment is a copolycondensation product of p-hydroxybenzoic acid and 2-hydroxy-6-naphthoic acid.

10. The thermoplastic resin composition as claimed in claim 7 wherein said aromatic polyester segment is a copolycondensation product of p-hydroxybenzoic acid, 2,6-naphthalene-dicarboxylic acid, and 2,6-naphthalenediol.

11. The thermoplastic resin composition as claimed in claim 7 wherein said aromatic polyester segment is a copolycondensation product of p-hydroxybenzoic acid, 2,6-naphthalenedicarboxylic acid, hydroquinone, and isophthalic acid.

12. The thermoplastic resin composition as claimed in claim 1 wherein said polyorganosiloxane segment is represented by a formula

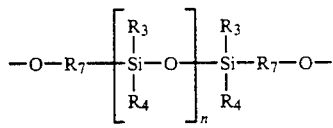

wherein $R_3$ and $R_4$ individually indicate methyl or phenyl; $R_7$ indicates a lower alkylene or a lower alkylene ether; and n is an integral number of 10 or greater.

* * * * *